United States Patent [19]

Hill et al.

[11] Patent Number: 5,537,683
[45] Date of Patent: Jul. 16, 1996

[54] RADIO PAGING SYSTEM WITH ANTENNA PATTERN EXHIBITING HIGH DIVERSITY GAIN

[75] Inventors: Thomas C. Hill, Wellington; Kazimierz Siwiak, Coral Springs, both of Fla.

[73] Assignee: Motorola, Inc., Schaumburg, Ill.

[21] Appl. No.: 514,549

[22] Filed: Aug. 14, 1995

[51] Int. Cl.[6] ............................................. H04Q 7/12
[52] U.S. Cl. .......................... 455/33.1; 455/52.1; 455/65
[58] Field of Search ......................... 455/33.1, 33.3, 455/34.1, 34.2, 50.1, 52.1, 52.3, 54.1, 56.1, 63, 132, 272, 49.1, 65, 269; 379/59; 340/825.44, 311.1

[56] References Cited

U.S. PATENT DOCUMENTS 3,906,166  9/1975  Cooper et al. .
4,128,740  12/1978  Graziano .
5,067,173  11/1991  Gordon et al. ..................... 455/33.1
5,392,451  2/1995  Schwendeman et al. ............ 455/56.1

OTHER PUBLICATIONS

Advanced Mobile Phone Service, The Cellular Concept by V. H. MacDonald, The Bell System Technical Journal, Jan. 1979, pp. 15–41.

Primary Examiner—Reinhard J. Eisenzopf
Assistant Examiner—Nguyen Vo
Attorney, Agent, or Firm—John H. Moore

[57] ABSTRACT

A radio paging system includes one or more transmitters (12) for sending radio signals to pagers (14) within a paging service area (10). Receivers (22) are located within the service area to receive low power transmissions from the pagers. These receivers are coupled to omnidirectional antennas (24, 26) that are disposed in pairs to form a two branch diversity antenna system. Each pair of antennas is located in a cell that forms part of a four cell cluster (66), and each pair of antennas is located on an axis (42) running through its cell. The axes are selected to provide a high and uniform level of diversity gain throughout the cluster.

14 Claims, 4 Drawing Sheets

RADIO PAGING SYSTEM WITH ANTENNA PATTERN EXHIBITING HIGH DIVERSITY GAIN

FIELD OF THE INVENTION

This invention is generally directed to the field of radio paging systems; it is particularly directed to a radio paging system in which a number of fixed site antennas are used to send and receive radio signals to/from portable pagers that are located in or near a radio paging service area.

BACKGROUND OF THE INVENTION

In conventional paging systems, one or more fixed site radio transmitters broadcast pager addresses as well as messages throughout a radio paging service area. A pager which receives its address and any accompanying message decodes its message and alerts the user to the receipt of the message.

More recently, two-way pagers have been introduced. Such two-way pagers may receive paging messages as described above, and they are also capable of acknowledging receipt of a message. This acknowledgment is typically accompanied by the pager automatically transmitting a short acknowledgment signal back to a fixed site receiver located at a base station.

In order to maintain a reasonable battery life for the two-way pager, the acknowledgment signal it sends is necessarily a low power signal. Despite this limitation on a pager's output power, it is necessary for the base station to reliably receive each acknowledgment signal transmitted by the pagers in its area.

Due to factors such as uneven land contour and the presence of buildings, it is likely that radio transmissions sent by pagers will be reflected or scattered several times before they arrive at the receiving base station. The resulting reflections of the transmitted signal can combine to produce peaks and nulls in the signal which can result in a very weak signal arriving at the receiving base station.

This problem can be somewhat alleviated by increasing the power of the pager's transmitted signal. However, the pager's battery life, and/or battery size, would be adversely affected.

A conventional technique that is sometimes used in the cellular radio telephone industry includes using a three branch diversity system in which a group of three antennas are arranged in a triangular pattern at a base site to receive incoming signals. The desired result is that at least two of the three antennas will always exhibit sufficient diversity gain to overcome the weak signal problem discussed above. The drawback of this approach is primarily economic in that the cost of equipment is higher than can normally be justified for paging systems.

Another technique sometimes used in the cellular radio telephone industry is to use an antenna system with two branch sectored diversity. With this technique, each cell is divided into three equal sectors, with two directional antennas located in each sector, but the cost of implementing this system is also prohibitive for paging systems.

DESCRIPTION OF THE PREFERRED EMBODIMENT

Figure 1:
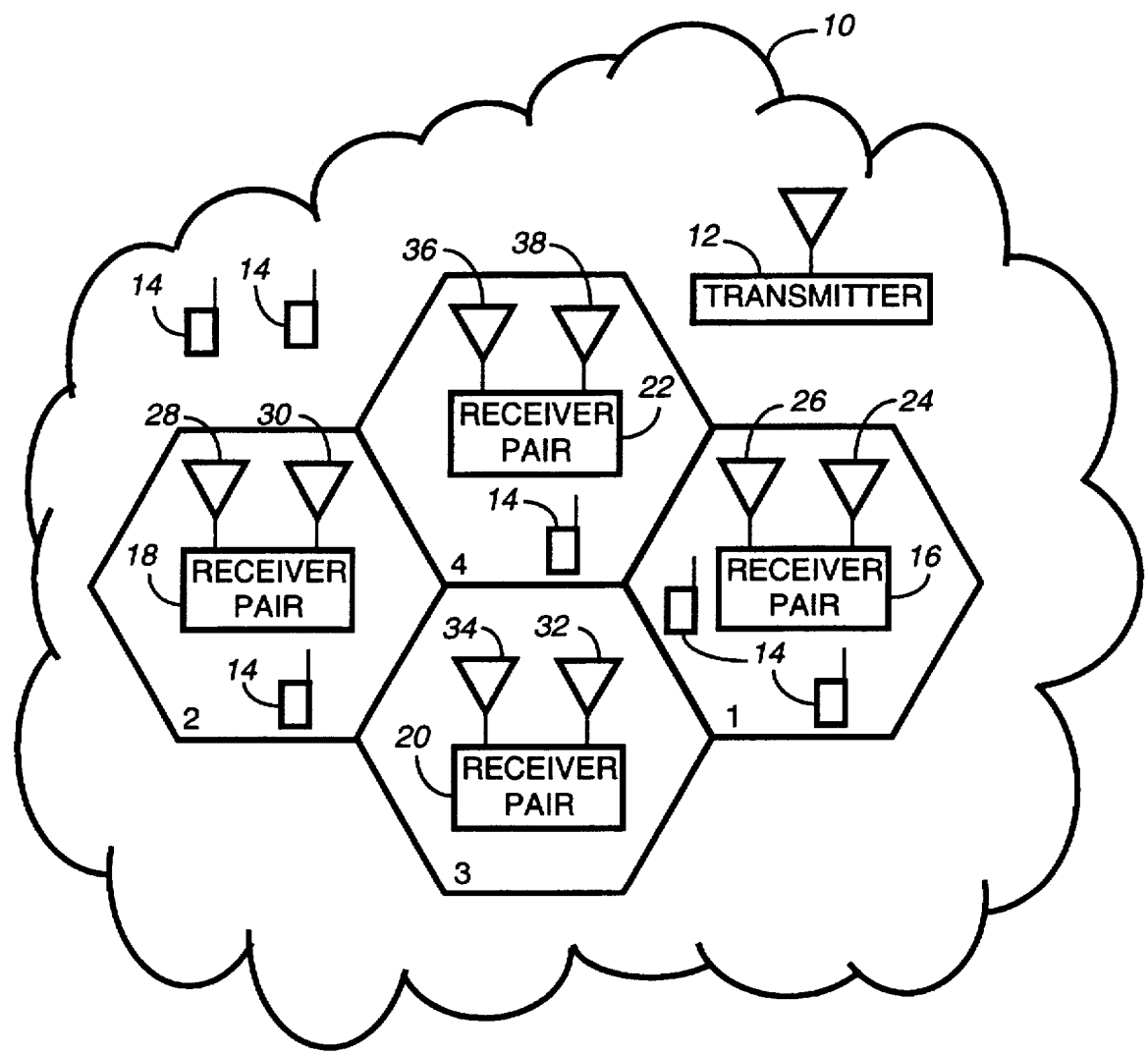
FIG. 1 illustrates a radio paging service area within which there is a radio paging system constructed in accordance with the invention.

Referring to FIG. 1, a radio paging service area 10 is shown. Within the service area 10, there is a radio paging system that includes at least one fixed site transmitter 12 that transmits addresses and messages to selected portable pagers 14 that are located in or near the service area 10. Although only one transmitter is shown, it should be understood that there may be a plurality of transmitters spread throughout the service area, depending on the needs of the system. In some cases, it will be desirable to locate a transmitter within each of the cells that will be described below.

The portable pagers 14 may be conventional receive-only pagers, or they may be conventional two-way pagers capable of sending messages to fixed site receivers. This invention is particularly useful with radio paging systems that serve two-way pagers.

The illustrated service area 10 is shown as having a cluster of four cells, numbered 1, 2, 3 and 4. As shown, these cells cover only a portion of the service area 10. To cover the entire service area, one may add similar clusters of cells.

Also located within the service area 10 are a plurality of fixed site receivers for receiving signals (such as acknowledgment signals) transmitted by the pagers 14. These receivers are shown as receiver pairs 16, 18, 20 and 22, wherein each such receiver pair includes two fixed site receivers. In the illustrated embodiment, the receiver pair 16 is located in cell 1, receiver pair 18 is located in cell 2, receiver pair 20 is located in cell 3, and receiver pair 22 is located in cell 4. Each individual receiver in a receiver pair preferably has its own omnidirectional receiving antenna. Thus, each of the two receivers within the receiver pair 16 is coupled to one of the antennas 24, 26. Similarly, receiver pair 18 has receiving antennas 28 and 30, receiver pair 20 has receiving antennas 32 and 34, and receiver pair 22 has antennas 36 and 38.

It should be noted that the two receivers included in each receiver pair need not be combined as one unit. The two receivers that are shown as a pair may be, and ordinarily will be, discrete receivers that are physically separated from each other and located in close proximity to their respective receiving antennas.

The receiving antennas may be dipole antennas, and the distance between two antennas in the same cell is approximately ten feet when the pagers' transmission frequency is around 900 MHz.

Referring again to the cells 1, 2, 3 and 4, it can be seen that they each preferably have a hexagonal shape. The area within each hexagonal cell approximates the coverage area associated with each receiver pair. For example, the coverage area associated with receiver pair 16 is represented by the area bounded by the cell 1. Further, the cells 1, 2, 3 and 4 are preferably clustered together as shown such that each cell is contiguous to at least two other cells in the same cluster. For example, cells 1 and 2 are both contiguous to cells 3 and 4.

The arrangement shown in FIG. 1 illustrates only the portions of a paging system which are relevant to the present invention. Those skilled in the art will recognize that a complete paging system will include additional conventional components such as controllers, terminal hardware, and various connections to telephone land lines. All those conventional components have not been shown in order to simplify the description of this invention.

As discussed above, it can be difficult to reliably receive low power signals transmitted by pagers, particularly in areas where a transmitted signal can be reflected or scattered. To overcome this problem, the present invention employs two branch diversity gain to decorrelate signals received via multiple paths. The concept of two branch diversity gain will be explained with reference to FIG. 2.

The phrase "two branch" refers to the use of two antennas which are separated from each other by a selected distance. The phrase "diversity gain" refers to the ability of a pair of antennas to decorrelate a pair of signals originating from the same source but arriving at the antennas via different paths due to scattering. When two signals are maximally decorrelated, the peaks of one signal are interleaved with the valleys of the other signal so that the two signals do not interfere with each other. This condition is referred to as maximum diversity gain, which is the desired result. Minimum diversity gain (not desired) results when the peaks and valleys of one signal are coincident with the peaks and valleys of the other signal.

Figure 2:
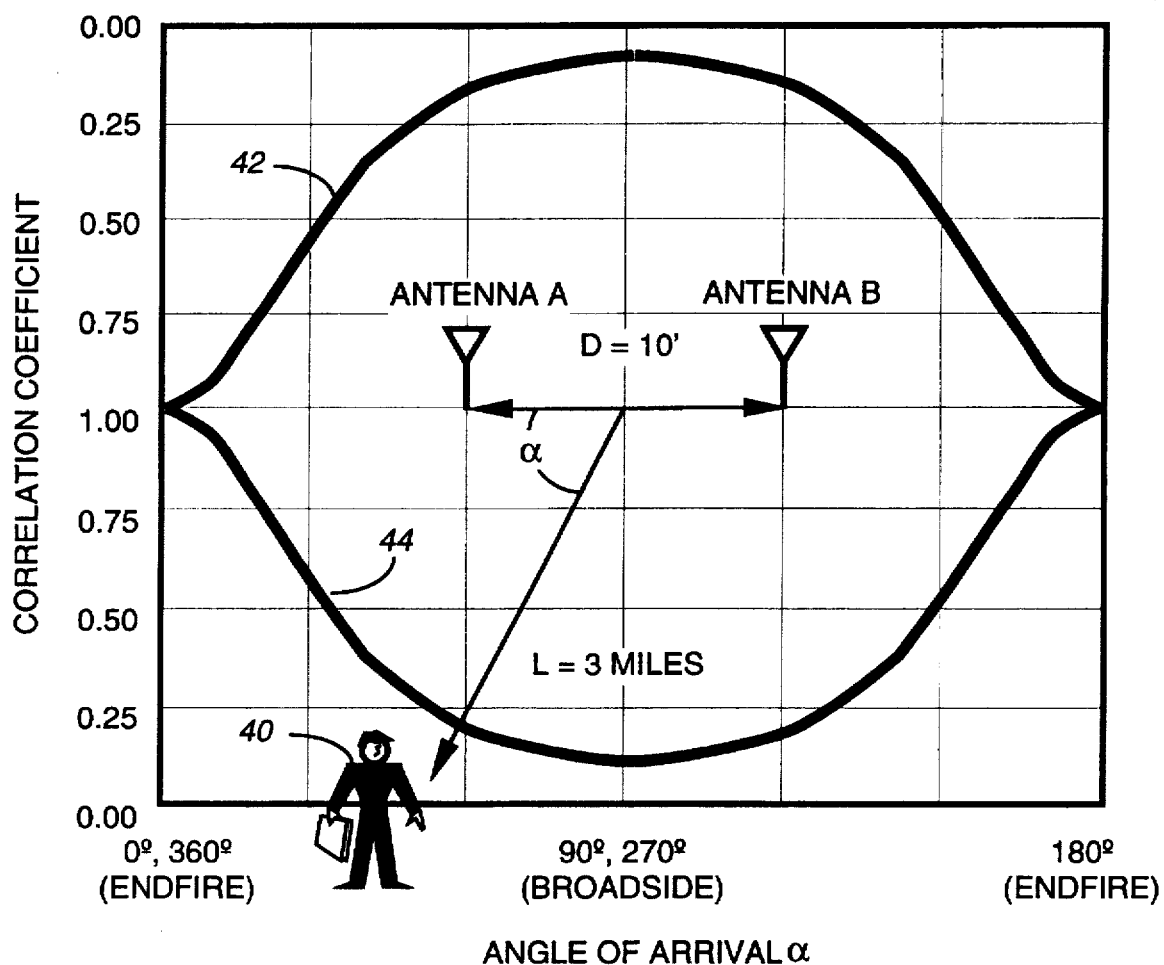
FIG. 2 is a graph that is useful in explaining the diversity gain achieved by the arrangement of antennas according to the invention.

FIG. 2 shows antenna A and antenna B that are separated from each other by a distance of ten feet for the purpose of receiving signals whose frequencies are approximately 900 MHz. The horizontal axis represents angles of arrival α (in the horizontal plane) of a signal from a pager user 40 in the situation where the effective distance of scatterers from the pager user 40 is 300 feet (light city environment). The vertical axis represents the correlation coefficient associated with signals received by the antennas, and the curves 42 and 44 show how the correlation coefficient varies with the angle of arrival α.

It can be seen that the correlation coefficient is maximum when α is zero degrees and 180 degrees. A maximum correlation coefficient means minimum decorrelation and minimum diversity gain. As the angle α moves toward 90 degrees or 270 degrees, the correlation coefficient gets smaller and diversity gain increases. The desired maximum diversity gain occurs when the signal from the pager user 40 arrives broadside (at 90 degrees or 270 degrees) to the antennas.

Figure 3:
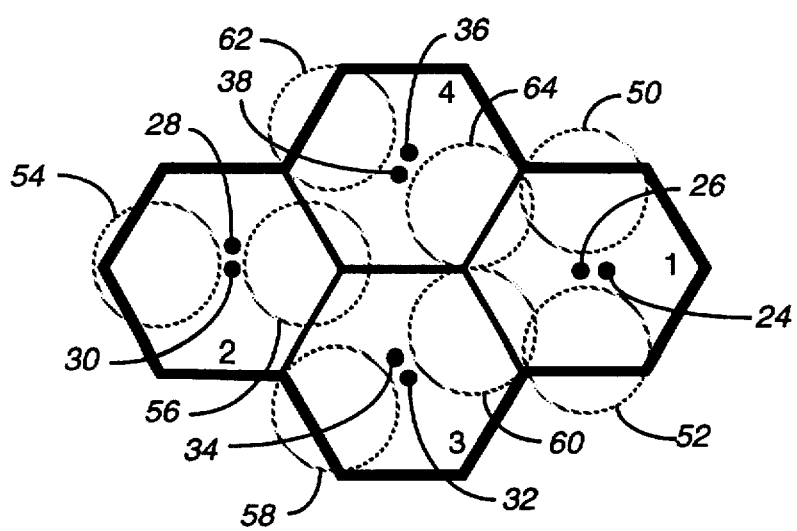
FIG. 3 shows a cluster of four cells and the arrangement of antennas within the cells for use in the system shown in FIG. 1.
Figure 4:
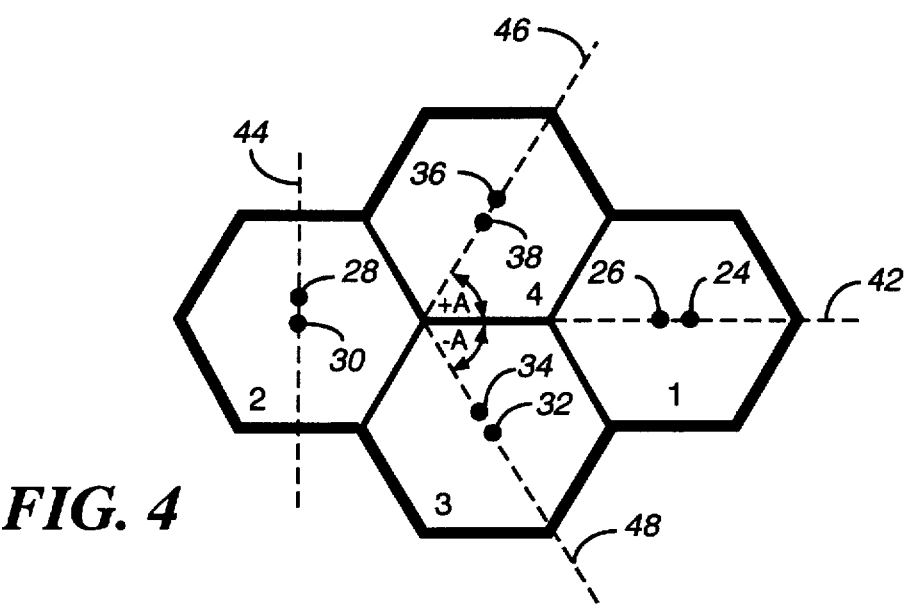
FIG. 4 shows the four-cell cluster of FIG. 2, plus the axes on which the antennas are located.

Two branch diversity gain is used in the present paging system as best shown in FIGS. 3 and 4. Referring first to FIG. 3, the cells 1, 2, 3 and 4 are shown in the same clustered arrangement as in FIG. 1. In FIG. 3, however, each omnidirectional receiving antenna is represented by a small circle. Thus, antennas 24 and 26 (FIG. 1) are shown as small circles 24 and 26 in FIG. 3. The antennas in the other cells are similarly represented.

Referring now to FIG. 4, the same cluster of cells and antennas are shown. FIG. 4 additionally shows how the antennas are disposed on various axes. In cell 1, the antennas 24 and 26 are located substantially at the center of the cell and on an axis 42 that runs through the cell. In cell 2, the antennas 28 and 30 are also located substantially at the center of the cell and on an axis 44 that runs through cell 2. Significantly, the axis 44 is substantially perpendicular to the axis 42. The selection of the axes for these cells helps to promote maximum diversity gain for the area covered by the cluster of cells, as will be more fully discussed below.

Referring again to FIG. 4, it can be seen that the antennas for cells 3 and 4 are also located substantially in the centers of their respective cells and on axes 46 and 48. The axes 46 and 48 are oriented in directions that are different from each other and different from the directions in which the axes of cells 1 and 2 are oriented. Preferably, the axis 48 of cell 3 intersects the axis 42 of cell 1 at a selected angle −A, and the axis 46 of cell 4 intersects the axis 42 at an angle of +A. In the preferred embodiment, the angle A is substantially equal to 60 degrees. This selection of axes gives a relatively uniform and high level of diversity gain, as will now be described with reference to FIG. 3.

In FIG. 3, the diversity gain exhibited by each pair of antennas is illustrated by dashed lines defining lobes 50, 52 in cell 1, lobes 54, 56 in cell 2, lobes 58, 60 in cell 3, and lobes 62, 64 in cell 4. The pair of lobes 50, 52 in cell 1 represent the diversity gain associated with the pair of antennas 24, 26. They illustrate that diversity gain is maximum for signals received broadside to the axis on which antennas 24 and 26 are located, and diversity gain decreases for signals arriving at other angles.

The lobes associated with each pair of antennas extend away from their associated antennas in a direction that is dependent on the orientation of the axis on which the associated pair of antennas is located. By changing the orientation of the various axes, the orientation of the lobes also changes, and, therefore, the overall diversity gain of the cluster changes. With the selection of axes shown in FIGS. 3 and 4, it can be seen that the lobes 58, 60, and 62, 64 substantially fill in portions of the cluster that are not covered by the lobes associated with the antennas in cells 1 and 2. Hence, maximum overall diversity gain is achieved.

Figure 5:
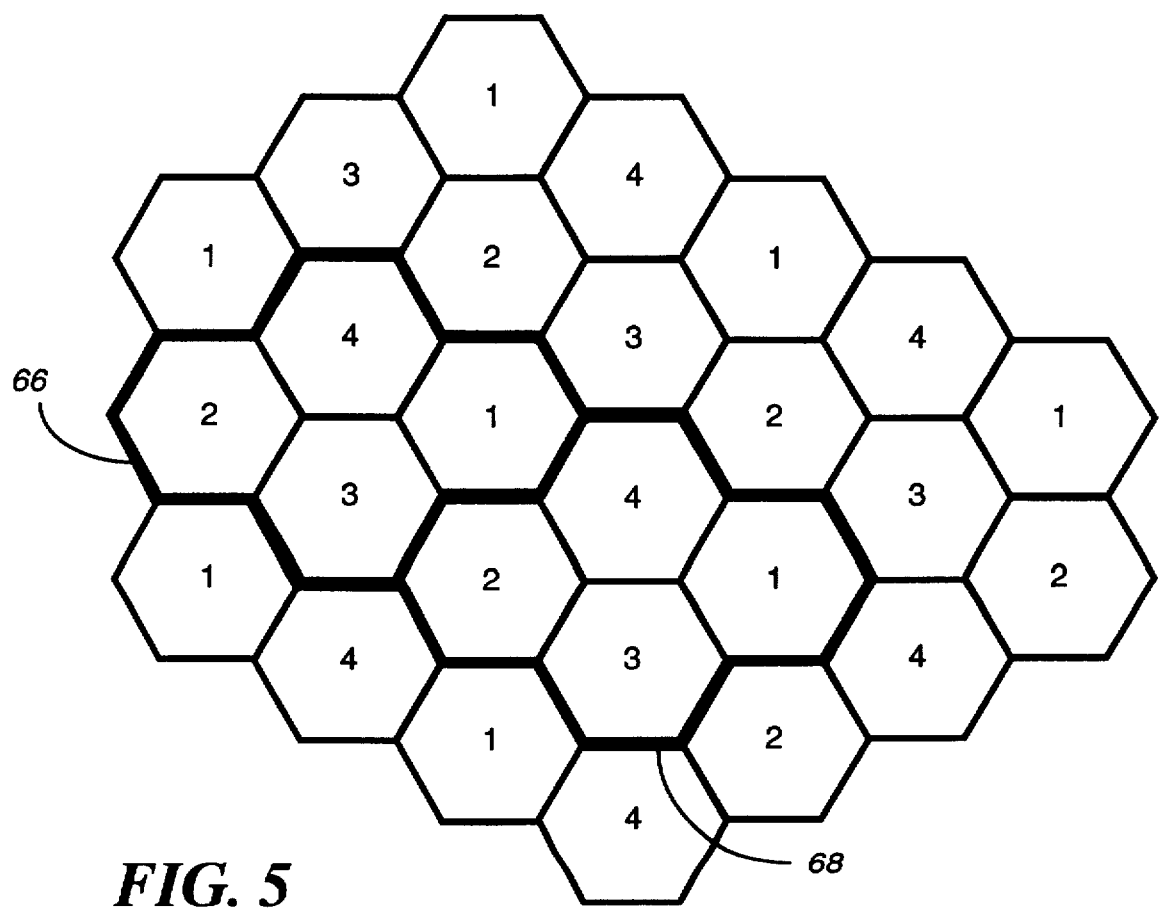
FIG. 5 shows multiple four-cell clusters arranged in a repeating pattern in accordance with the invention.

To cover a wider area than a single four-cell cluster is capable of covering, additional four-cell clusters are added, as shown in FIG. 5. In the illustrated arrangement, a four-cell cluster 66 contains cells corresponding to cells 1, 2, 3 and 4. Each additional cluster of cells, such as cluster 68, repeats the same pattern of cells, and each such cluster is contiguous to other such clusters to form a repeating pattern of similar clusters.

In the clusters shown in FIG. 5, each of the four cells has a pair of omnidirectional antennas (not shown) that are located on an axis that runs through the associated cell. The axes of first and second of the four cells are substantially perpendicular to each other. The axes of the third and fourth cells of the cluster are oriented in directions that are different from each other and different from the direction in which the axes of the first and second cells are oriented. Preferably, the axes of the third and fourth cells are oriented as shown in FIG. 4 so as to maximize the diversity gain of the entire cluster.

Figure 6:
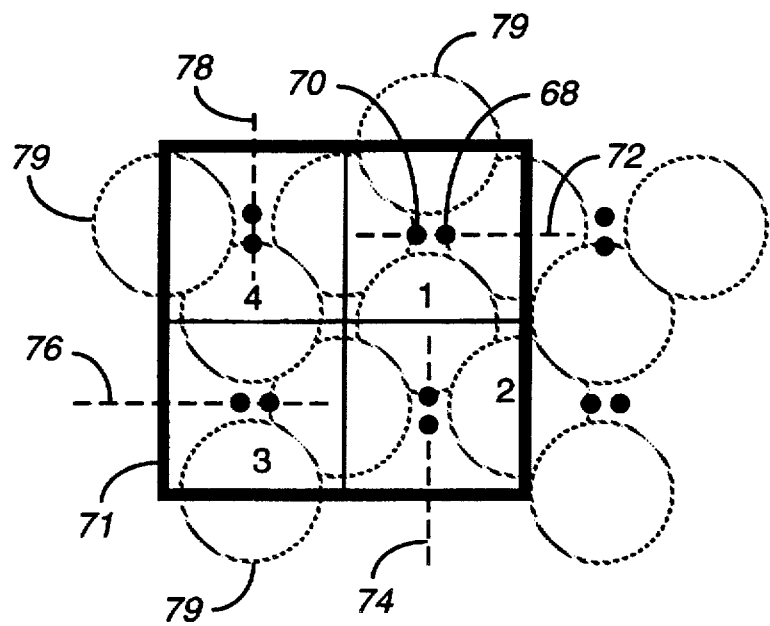
FIG. 6 shows an alternate arrangement of antennas in a four-cell cluster in accordance with the invention.

An alternative four-cell cluster according to the invention is shown in FIG. 6 wherein each cell has a substantially rectangular boundary. Each cell is contiguous to two other cells in the cluster, and the cells are arranged to form a substantially rectangular cluster 71.

Each cell in cluster 71 has a pair of omnidirectional antennas that are represented by small round circles, and the lobes representing the antennas' diversity gain are shown as dashed-line circles.

Referring to cell 1, its antennas 68, 70 are located substantially in the center of the cell and on an axis 72. In cell 2, the antennas therein are also located substantially in the center of the cell and on an axis 74 that is substantially perpendicular to the axis 72 of cell 1.

In cell 3, the antennas therein are also located substantially in the center of the cell and on an axis 76 that is parallel to the axis 72 of cell 1.

In cell 4, the antennas therein are located substantially in the center of the cell and on an axis 78 that is substantially parallel to the axis 74 of cell 2.

With the arrangement shown in FIG. 6, each cell shares a common boundary with two adjacent cells in the cluster, and the axes of adjacent cells are oriented substantially perpendicular to each other. This selection of axes ensures that a high and substantially uniform level of diversity gain is achieved for the cluster 71. This result is illustrated by the dashed-line lobes 79 that graphically show the level of diversity gain that is provided throughout the cluster.

Figure 7:
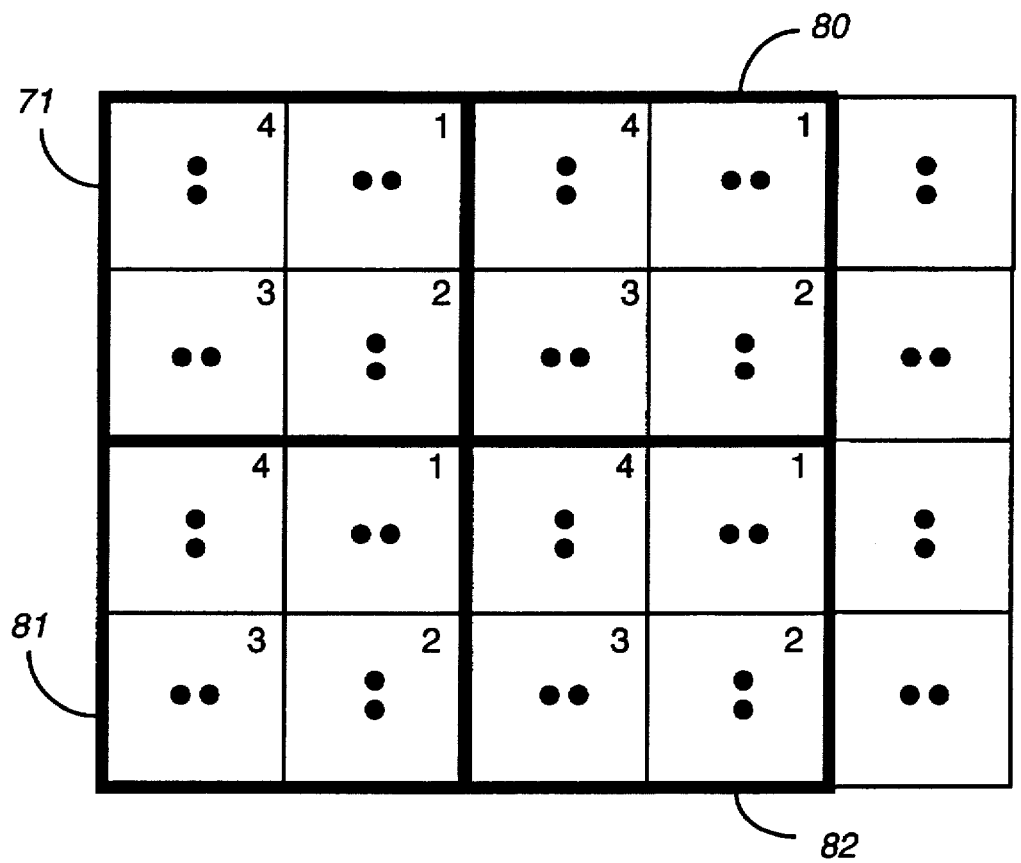
FIG. 7 shows multiple four-cell clusters having the arrangement of antennas shown in FIG. 6.

The arrangement of cells shown in FIG. 6 may be replicated as shown in FIG. 7 when it is desired to cover a larger area. In this arrangement, additional four-cell clusters 80, 81 and 82 are included, each of which has an arrangement of antennas that is identical to the cluster 71. Each of these additional clusters is contiguous to other clusters to form a repeating pattern of similar clusters.

In view of the foregoing description, it will be apparent that a radio paging system according to the invention provides uniformly high diversity gain that can be repeated over a wide area of coverage. This provides more reliable reception of low power signals transmitted by pagers without paying a high cost penalty.

Although the invention has been described in terms of a preferred embodiment, it will be obvious to those skilled in the art that various alterations and modifications may be made without departing from the invention. Accordingly, it is intended that all such alterations and modifications be considered as within the spirit and scope of the invention as defined by the appended claims.

We claim:

1. A radio paging system for communicating with a plurality of portable pagers located within or near a paging service area, comprising;
   at least one fixed site transmitter for sending radio signals to selected portable pagers;
   a plurality of fixed site receivers located within the service area;
   a plurality of omnidirectional antennas coupled to the receivers and disposed in a cluster of four cells located within the service area, each cell having a center, with a pair of antennas being associated with each cell and located substantially at the center of an associated cell and on an axis that runs through the associated cell, the axes of first and second of the four cells being substantially perpendicular to each other.

2. A radio paging system as set forth in claim 1 wherein lobes representative of diversity gain are associated with each pair of antennas, the lobes extending away from their associated pair of antennas in a direction that is dependent on the orientation of the axis on which the associated pair of antennas is located, and wherein the axes of third and fourth of the four cells are oriented such that the lobes associated with the pairs of antennas in the third and fourth cells substantially fill in portions of the cluster that are not covered by the lobes associated with the pairs of antennas in the first and second cells.

3. A radio paging system as set forth in claim 2 wherein the axes of the third and fourth cells are oriented in directions which are different from each other and different from the directions in which the axes of the first and second cells are oriented.

4. A radio paging system as set forth in claim 1 wherein each cell has a substantially hexagonal boundary, and wherein the four cells are clustered together such that each cell is contiguous to at least two other cells in the same cluster of cells.

5. A radio paging system as set forth in claim 4, further including additional clusters of four cells, each such additional cluster being contiguous to other such clusters of cells to form a repeating pattern of similar clusters.

6. A radio paging system as set forth in claim 1 wherein a third cell of the cluster has an axis that intersects the axis of the first cell at a selected angle −A, and a fourth cell of the cluster has an axis that intersects the axis of the first cell at an angle of +A.

7. A radio paging system as set forth in claim 6 wherein the angle A is substantially equal to 60 degrees.

8. A radio paging system as 'set forth in claim 1 wherein the axis associated with a third cell of the cluster is oriented parallel to the axis of the first cell, and wherein the axis associated with a fourth cell of the cluster is oriented parallel to the axis of the second cell.

9. A radio paging system as set forth in claim 8 wherein each cell has a substantially rectangular boundary.

10. A radio paging system as set forth in claim 9 wherein each cell is contiguous to two other cells in the cluster, and wherein the cells are arranged to form a substantially rectangular cluster.

11. A radio paging system as set forth in claim 9 wherein each cell shares a common boundary with two adjacent cells in the cluster, and wherein the axes of adjacent cells are oriented substantially perpendicular to each other.

12. A radio paging system for communicating with a plurality of portable pagers located within or near a paging service area, comprising
   at least one fixed site transmitter for sending radio signals to selected portable pagers;
   a plurality of fixed site receivers located within the paging service area;
   a plurality of omnidirectional antennas coupled to the receivers and disposed in a cluster of first, second, third and fourth cells, each cell having a substantially hexagonal boundary, the cells being arranged such that each cell is contiguous to at least two other cells within the cluster, each cell having a center, with a pair of antennas being associated with each cell and located substantially at the center of an associated cell and on an axis that runs through the associated cell, the axes of the first and second cells being substantially perpendicular to each other, the axis of the third cell intersecting the axis of the first cell at an angle of about −60 degrees, and the axis of the fourth cell intersecting the axis of the first cell at an angle of about +60 degrees.

13. A radio paging system as set forth in claim 12, further including additional clusters of four cells, each such additional cluster being contiguous to other such clusters of cells to form a repeating pattern of similar clusters.

14. A radio paging system for communicating with a plurality of portable pagers located within or near a paging service area, comprising;

at least one transmitter for sending radio signals to selected portable pagers;

a plurality of fixed site receivers located within the paging service area;

a plurality of omnidirectional antennas coupled to the receivers and disposed in a cluster of first, second, third and fourth cells each having a substantially rectangular boundary, the cells being arranged such that each cell shares a common boundary with two adjacent cells in the cluster, wherein each cell has a center, with a pair of antennas being associated with each cell and located substantially at the center of an associated cell and on an axis that runs through the associated cell, and wherein the axes of adjacent cells are oriented perpendicular to each other.

* * * * *